United States Patent [19]

Sokolski et al.

[11] Patent Number: 4,896,858
[45] Date of Patent: Jan. 30, 1990

[54] FLEXIBLE MUG HOLDER

[75] Inventors: Robert Sokolski; John Downey, both of Warren, Pa.

[73] Assignee: Whirley Industries, Inc., Warren, Pa.

[21] Appl. No.: 199,534

[22] Filed: May 27, 1988

[51] Int. Cl.⁴ .............................................. A47K 1/08
[52] U.S. Cl. ............................... 248/311.2; 248/231.8
[58] Field of Search .............. 248/311.2, 309.1, 316.5, 248/231.5, 231.8, 310, 312.1, 148, 346, DIG. 10, 311.3, 312; 220/85 H

[56] References Cited

U.S. PATENT DOCUMENTS

| | | | |
|---|---|---|---|
| 1,902,608 | 3/1933 | Baltzley et al. | 248/313 |
| 2,215,411 | 9/1940 | Sebring | 220/85 H |
| 2,628,054 | 2/1953 | Fazakerley | 248/311.2 |
| 3,269,683 | 8/1966 | Shinaver | 248/311.2 X |
| 3,532,318 | 10/1970 | Lloyd | 248/302 X |
| 3,814,367 | 6/1974 | Rasmussen | 248/311.2 |
| 3,908,952 | 9/1975 | Von Alven | 248/311.3 X |
| 4,191,350 | 3/1980 | Ormond | 248/311.2 X |
| 4,655,425 | 4/1987 | Wallace et al. | 248/311.2 |

FOREIGN PATENT DOCUMENTS 2738735  3/1979  Fed. Rep. of Germany ... 248/311.2

Primary Examiner—Ramon S. Britts
Assistant Examiner—Karen J. Chotkowski
Attorney, Agent, or Firm—Reed Smith Shaw & McClay

[57] ABSTRACT

The present invention provides a removable flexible holder for an open-top liquid container which is especially designed to be used in an automobile or other type of vehicle. The holder uses a flexible hinge for its base which enables the holder to expand or contract to accommodate various sizes of containers. The holder also has an attachment means which adjusts to almost any size of car door due to a bendable hinge which resiliently urges the holder against the car door. Additionally, the holder has a slot which will accommodate a container having a handle such as a mug.

19 Claims, 2 Drawing Sheets

FLEXIBLE MUG HOLDER

FIELD OF THE INVENTION

The present invention relates generally to a holder for maintaining open-top liquid containers in an upright position and more specifically to a removable cup or mug holder for use in a vehicle.

BACKGROUND OF THE INVENTION

Various designs and configurations for open-top liquid container holders have been used before. U.S Pat. Nos. 1,782,962 to Hobbs; 3,269,683 to Shinaver; and 4,191,350 to Ormond, each disclose a cage-type holder comprising vertical struts joined at their upper and lower ends to two rings for providing wall support for the container. The Shinaver holder has a base made from eight fixed arms extending radially like the spokes of a wheel from a common central portion to a corresponding vertical strut. This cage-type holder, however, is not flexible because of its fixed-diameter base and therefore, it cannot be used for a wide variety of container sizes. The Hobbs holder also has a fixed diameter base due to member 12. Similarly, the Ormond container cannot expand to hold a container larger than lower ring 42.

U.S. Pat. No. 1,902,608 to Baltzley et al. discloses a holder for a glass having an expandable supporting base, however, this holder is complicated and hard to make because of its many moving parts. The following patents show other designs and configurations for container holders: U.S. Pat. Nos. 1,778,823; 1,903,225; 3,568,969; 3,814,367; 4,131,259; 4,634,089; 4,654,274; 4,655,425; and 4,678,154.

It would be desirable, to provide a flexible holder for an open-top liquid container having a simple, expandable base which can receive a variety of different sizes of containers and which could be easily attached to or removed from a support such as a car window. Preferably, the holder could also accommodate containers having a handle such as a mug.

SUMMARY OF THE INVENTION

The present invention generally relates to a flexible holder for a container and more specifically to a removable holder for an open-top liquid container which has a flexible base that can accommodate containers of various sizes. The present invention utilizes a flexible hinge as its base which permits the holder to expand and contract, thereby adjusting itself to snuggly hold containers of various sizes. Preferably, the holder has a gap in it which can accommodate a protrusion from the container such as a handle.

Another important advantage of the holders of the present invention is that they can easily be stacked since one holder nests inside of another holder due to the flexible base and the tapered sides. This is very important in manufacturing, distributing and displaying the holders since a stack of holders of the present invention does not require near the amount of storage space that is required for holders with a fixed base.

Generally, the present invention comprises a cylindrical, cage-type holder for a container made of a resilient material and comprising an expandable hinge as a supporting base wherein a plurality of curved arms extend outwardly from a common hub at the center of the base to a plurality of members. Preferably, the arms are flexible but they may be comprised of a flexible first portion connected to the hub and a rigid second portion connected to the members.

The intersections of the arms and the members define the periphery of the flexible hinge such that an outwardly radial force on the members causes the flexible hinge to expand, thereby increasing the periphery of the base. The members extend upwardly from the arms to a circular ring which defines the upper periphery of the holder, while the members form the supporting sides and walls thereof. Preferably, the circular ring is of a larger diameter than the periphery of the base so that the supporting sides are tapered and enable the holders to be stacked easily one inside another. Also, the upper circular ring, preferably, has a gap which can accommodate the handle of a container such as a mug.

The holder also contains an attachment means for removably mounting it to an object such as a door or window of a vehicle or car. Preferably, the attachment means is connected to the ring at a point opposite the gap and comprises a first flange which extends upwardly and then outwardly to provide clearance from the ring, a bendable hinge attached to the first flange and a second flange attached to the bendable hinge which extends both upwardly and downwardly from the bendable hinge such that the bendable hinge resiliently urges the holder toward the door. Preferably, the first flange is L-shaped and the second flange further comprises two spaced-apart protruding tongs that can be inserted between two surfaces, such as the window and door of a car, for better stability. The bendable hinge operates such that the protruding tongs of the second flange exert a force inwardly toward the first flange and holder rather than outwardly as in other holders. This enables the bendable hinge to urge the holder into close engagement with the door.

Other details, objects and advantages of the present invention will become more readily apparent from the following description and accompanying drawings of a presently preferred embodiment thereof.

BRIEF DESCRIPTION OF THE DRAWINGS

In the accompanying drawings, a preferred embodiment of the present invention is illustrated, by way of example only, wherein.

DESCRIPTION OF THE PREFERRED EMBODIMENT

Figure 1:
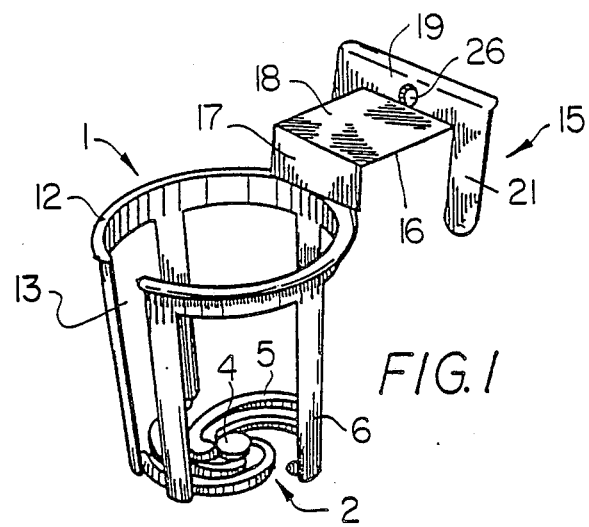
FIG. 1 is a perspective view of the holder of the present invention.

FIG. 1 shows a perspective view of the container holder 1 of the present invention utilizing the expandable or flexible hinge 2 as the base 3 of the holder. The flexible hinge 2 can be seen more clearly in FIGS. 2 and 3. Preferably, the base has a common hub 4 at its center with a plurality of curved arms 5 extending outwardly therefrom. The arms 5 are attached at one end to the hub 4 and at the other end to a plurality of members 6 which define the periphery of base 3. Preferably, the members 6 extend upwardly from arms 5 and form the sides or walls of the holder 1.

While the embodiment shown in the Figures has four arms 5a–5d and five members 6a–6e with one arm 5a being connected to two members (6a,6b), this is not the only possible configuration. Many other configurations would be apparent to one skilled in the art. For example, three or five arms could be used as long as the number of arms 5 is sufficient to provide a base upon which to rest the container when it is placed in holder 1. Similarly, the number of members 6 used to form the sides of the holder 1 may be more or less than that shown in the drawings. Also, the width of the members 6 may vary such that the sides of the holder 1 are more or less open.

Preferably the arms 5 are made from a resilient material such as plastic. In fact, the entire holder 1 is preferably made of a resilient material such as plastic. In this way the present invention can be mass produced using an injection mold and is also more durable. The holder, however, does not have to be made entirely from a resilient material. It could be made of material which is rigid, provided certain connection points are flexible as will be explained later.

Figure 2:
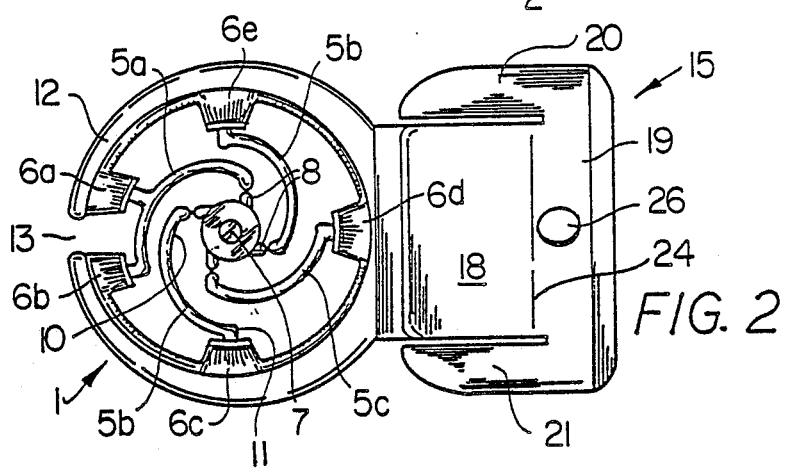
FIG. 2 is a top view of the mug holder shown in FIG. 1.
Figure 3:
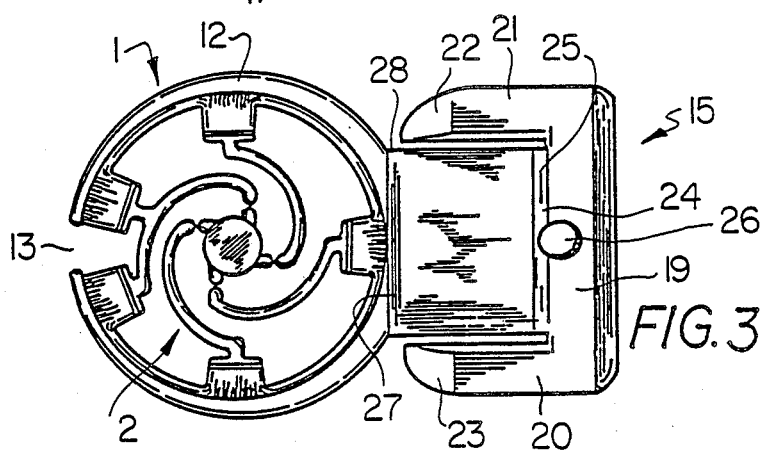
FIG. 3 is a bottom view of the mug holder shown in FIG. 1.

As shown in FIGS. 1, 2 and 3, the hub 4, preferably, is circular and the attachment points for arms 5 are evenly spaced about the hub 4. This helps distribute the forces evenly so that hub 4 rotates around its center point 7 as the flexible hinge expands and contracts rather than being displaced laterally. Preferably, hub 4 has a plurality of projections 8 which extend obliquely from the hub. The number of projections 8 should equal the number of arms 5 so that each arm 5 is connected to only one projection 8.

In one embodiment, arms 5 have a resilient or flexible first 10 portion and a second portion 11 which may be either ridged or flexible. Preferably, the first portion 10 is much smaller and thinner than the second portion 11 so that it can bend as the flexible hinge 2 expands and contracts. First portion 10 is attached to a projection 8. Second portion 11, preferably, is curved and is connected to at least one member 6.

Members 6 extend upwardly from arms 5 and connect with a ring 12 which defines the upper periphery of the holder 1. Preferably, members 6 extend upwardly and outwardly such that ring 12 is larger than the periphery of base 3. Thus, ring 12 and members 6 define an opening which tapers down to the smaller diameter base formed by flexible hinge 2. This enables one holder to be easily stacked inside another without requiring very much additional space. This is very important in the manufacture, distribution and display of the holders. Without this ability to nest inside one another, the holders would be much more difficult to manufacture and distribute because of the increased storage space required by them.

Figure 4:
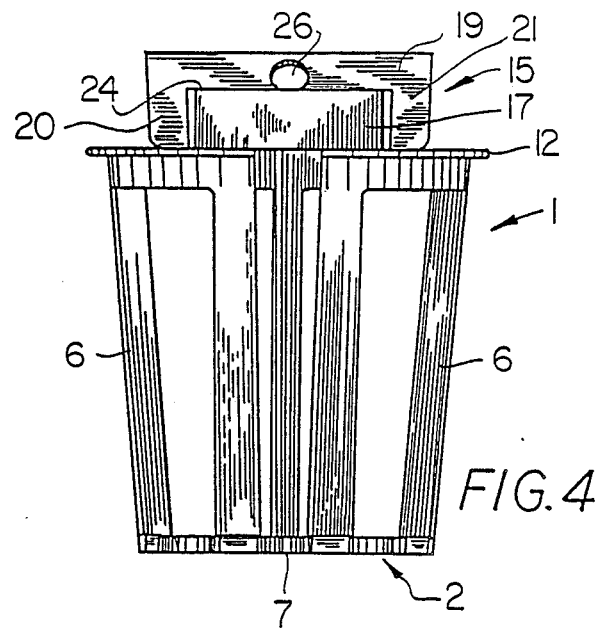
FIG. 4 is a front view of the mug holder shown in FIG. 1.
Figure 5:
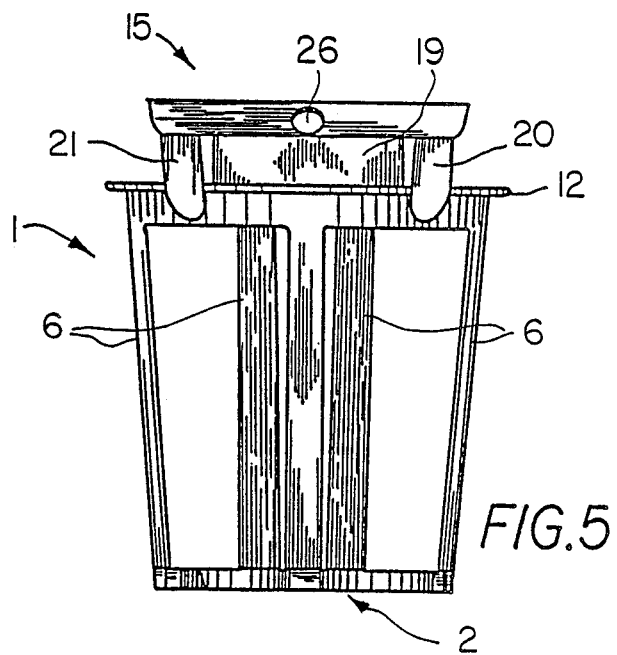
FIG. 5 is a back view of the mug holder shown in FIG. 1.

Ring 12 may be solid or, preferably, it has a gap 13 therein to accommodate a protrusion on a container such as a handle. As can be seen in FIGS. 1 and 4, the gap 13 along with the members 6a and 6b actually form a slot 14 through which the handle of a container such as a mug may protrude when it is resting on the base 3 in the holder 1.

Of course, the holder 1 cannot receive a container having as its smallest diameter a diameter which is larger than the diameter of ring 12 since a portion of the container must pass through ring 12. If, however, the base of the container is smaller than ring 12, but larger than the existing periphery of base 3, base 3 due to the flexible hinge 2, can expand to accommodate the larger diameter as the container is placed in the holder. As the flexible hinge 2 expands, base 3 expands and the bottoms of members 6 move outwardly to accommodate the base of the container. When the container is removed, the flexible hinge 2 contracts somewhat, attempting to return the base 3 to its original size. The tension in flexible hinge 2 when it expands helps hold the container snuggly within members 6. This design also enables the holders to be easily stacked, with the base of one holder sliding into and expanding the base of another holder just as a container would.

Holder 1 is designed to be easily attached to or removed from a support in a vehicle. Preferably, the support is a car window and door. An attachment means 15 connected to ring 12 is used to removably attach the holder 1 to a car window and door. Preferably, the attachment means 15 is connected to ring 12 directly opposite from gap 13 and comprises an L-shaped first flange 16 having a first portion 17 which extends upwardly from ring 12 and a second portion 18 which extends outwardly from the first portion 17 to provide clearance from ring 12, a bendable hinge 24, and a second flange 19 which extends both upwardly and downwardly from the bendable hinge 24 such that the action of bendable hinge 24 resiliently urges the holder 1 toward the door. Preferably, second flange 19 includes two protruding tongs 20 and 21 which are located on either side of horizontal second portion 18 and which descend and engage the inside of the door. Locating tongs 20 and 21 in this fashion provides greater stability than if they were located in some other fashion. The tongs 20 and 21 are tapered at ends 22 and 23 to enable them to slide easily between the window and the door when being inserted. Bendable hinge 24 also enables tongs 20 and 21 to be inserted more easily.

Preferably, bendable hinge 24 is formed by a groove 25 at the connection between the horizontal second portion 18 of first flange 16 and second flange 19 as shown in FIG. 3. This region should be made of a flexible material such as plastic to permit bendable hinge 24 to bend along groove 25 (see FIGS. 1 and 3). Preferably, another groove 27 is located at the connection between the first portion 17 and the second portion 18 of flange 16 to form a second bendable hinge 28. This groove also enables the flange 16 to bend if necessary when attaching the holder 1. The second flange 19 preferably has a hole 26 therein.

The bendable hinge 24 as well as the second bendable hinge 28 enable attachment means 15 to compensate for the different sizes of car doors. Present holders typically have a rigid engagement and are extremely difficult to insert in the window area and do not work well with the wide variety of car door sizes. The present invention, however, with at least one bendable hinge in the attachment means can be adjusted to fit almost any door.

While a presently preferred embodiment of practicing the invention has been shown and described with particularity in connection with the accompanying drawings, the invention may otherwise be embodied within the scope of the following claims.

What is claimed is:

1. An expandable hinge comprising: a plurality of curved arms lying in a plane, each arm comprising a flexible first portion and a rigid second portion, and a hub connected to one end of each of the arms, the arms extending outwardly from the hub and being attached to a plurality of members which define a periphery of the hinge such that an outwardly radial force on the members causes the hinge to expand, increasing its periphery.

2. The expandable hinge as described in claim 1 wherein a plurality of connections between the arms and the hub are evenly spaced about the hub.

3. The expandable hinge as described in claim 2 wherein the number of members equals the number of arms such that each arm is attached to only one member.

4. The expandable hinge as described in claim 2 wherein the number of members exceeds the number of arms such that at least one arm is attached to more than one member.

5. The expandable hinge as described in claim 2 wherein each arm is attached to a projection from the hub.

6. The expandable hinge as described in claim 1 wherein the flexible first portion of the arm is attached to the hub.

7. A flexible holder for a container comprising: an expandable hinge as described in claim 1 for a base; a ring defining an upper periphery of the holder such that the plurality of members extend upwardly from the base to the ring to form sides of the holder; and an attachment means connected to the ring for removably mounting the holder.

8. The expandable holder as described in claim 7 wherein the plurality of members form a cage-like, cylindrical holder.

9. The expandable holder as described in claim 7 wherein there the ring has a gap therein to accommodate a protrusion from the container.

10. The expandable holder as described in claim 9 wherein the protrusion is a handle of the container.

11. The expandable holder as described in claim 9 wherein the attachment means is connected to the ring opposite from the gap therein.

12. The expandable holder as described in claim 7 wherein the attachment means comprises a first flange, a bendable hinge attached to the first flange, and a second flange attached to the bendable hinge.

13. The expandable holder as described in claim 12 wherein the bendable hinge resiliently urges the second flange toward the holder.

14. The expandable holder as described in claim 13 wherein the second flange further comprises two spaced-apart protruding tongs.

15. The expandable holder as described in claim 14 wherein the attachment means further comprises a second bendable hinge located between a first portion of the first flange and a second portion of the first flange.

16. The expandable holder as described in claim 14 wherein the protruding tongs are narrower at a downward-most end than at an upward-most end and wherein the first flange is L-shape.

17. The expandable holder as described in claim 16 wherein the connections between the arms and the hub are evenly spaced about the hub.

18. The expandable holder as described in claim 17 wherein the curved arms comprise a flexible first portion and a rigid second portion, the flexible first portion being attached to the hub.

19. The expandable holder as described in claim 18 wherein the number of members exceeds the number of arms such that at least one arm is attached to more than one member.

* * * * *